Sept. 2, 1952 K. SCHLESINGER 2,609,507

VERTICAL DEFLECTION SYSTEM

Filed May 11, 1949

INVENTOR.
Kurt Schlesinger
BY Norman L. Mueller

Patented Sept. 2, 1952

2,609,507

UNITED STATES PATENT OFFICE 2,609,507

VERTICAL DEFLECTION SYSTEM

Kurt Schlesinger, Maywood, Ill., assignor to Motorola, Inc., Chicago, Ill., a corporation of Illinois Application May 11, 1949, Serial No. 92,701

9 Claims. (Cl. 250—36)

This invention relates generally to sawtooth voltage generators and more particularly to a simple circuit for producing a sawtooth voltage wave of relatively large ampltiude from a relatively low voltage source.

In the prior art it has been common practice to produce sawtooth voltage waves by charging and discharging of condensers. By charging a condenser at a linear rate, the trace portion of a sawtooth wave is produced and then by rapidly discharging the condenser the retrace portion is produced. A condenser can be charged at a linear rate by connecting the condenser across a source of potential in series with a large resistance so that the current flow is limited. However, the voltage wave produced by such a charging system is linear for a very limited portion only. In practice it has been found possible to obtain a linear trace which has an amplitude of the order of one-tenth the voltage of the charging source. It is therefore seen that a linear sawtooth wave which is produced by this method can have an amplitude of only a small portion of the voltage of the charging source. Although such a voltage wave can be amplified, this requires additional circuit elements such as vacuum tubes and coupling components and this is objectionable. By continuing the charging to provide a sawtooth wave of larger amplitude results in distortion of the trace portions of the wave which is not satisfactory in many applications. In particular, for use as a deflection generator in television systems, it is essential that the trace portion of the sawtooth wave developed be linear to a high degree of accuracy.

It is therefore an object of the present invention to provide a simple generator for producing sawtooth waves of large amplitude and with trace portions which are linear.

A further object of this invention is to provide a sawtooth voltage generator which requires a single discharge valve and which produces a linear sawtooth voltage wave having an amplitude of the order of 25% of that of the energizing voltage source.

A feature of this invention is the provision of a sawtooth voltage generator including a condenser across which a sawtooth wave of large amplitude is developed, and an electron discharge valve having the plate thereof connected to said condenser for discharging the same and the grid and cathode coupled to provide feedback which produces a blocking action.

A further feature of this invention is the provision of a sawtooth generator including a condenser across which a trace of relatively large amplitude is built up and a blocking oscillator for discharging the condenser, and in which the synchronizing pulses are superimposed on a sawtooth wave derived from the condenser to provide sharp triggering pulses for the blocking oscillator.

A still further feature of this invention is the provision of a blocking oscillator circuit for producing a large amplitude sawtooth wave having distortion of the decelerating type and means for integrating the distorted wave to produce a parabolic wave and for combining the distorted wave and the parabolic wave to produce a wave having a linear trace.

Further objects, features and advantages will be apparent from a consideration of the following description taken in connection with the accompanying drawings in which.

In practicing the invention there is provided a main charging condenser which is charged from a source of positive potential through a large resistor. The circuit is arranged so that the condenser is charged to a voltage above that at which the charging rate is linear with the rate thereafter decreasing with time. A blocking oscillator is provided for discharging the condenser including a vacuum tube, with the condenser being connected to the plate-cathode circuit of the tube and feedback being provided between the cathode and grid thereof. Synchronization pulses are applied to the blocking oscillator and are superimposed on a voltage wave derived from the output wave to provide sharp pulses for triggering the blocking oscillator. The distortion in the sawtooth wave developed across the condenser is corrected by a circuit which integrates the sawtooth wave to produce a parabolic wave and then combines the distorted sawtooth wave and the parabolic wave to produce a sawtooth wave having a linear trace.

Figure 1:
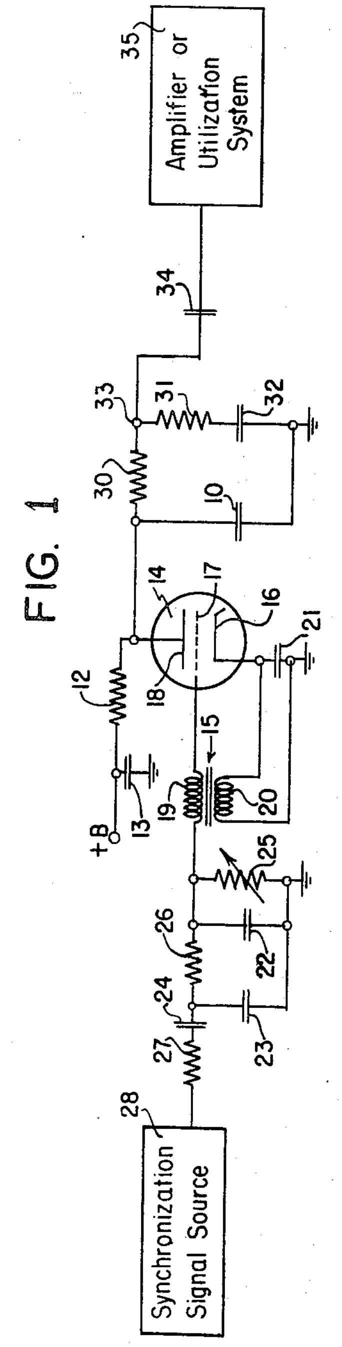
Fig. 1 illustrates the circuit in accordance with the invention.

Referring now to the drawings, Fig. 1 illustrates the circuit of the sawtooth voltage generator. A sawtooth voltage is developed across condenser means represented by the condenser 10. The condenser 10 is charged through resistor 12 connected to a source of potential indicated +B, which is bypassed by condenser 13. The condenser 10 is discharged by a blocking oscillator including the triode 14 and the transformer 15. The triode 14 includes a cathode 16, a grid 17, and a plate 18, and the transformer 15 includes a primary winding 19, and a secondary winding 20. It is apparent from Fig. 1 that the output circuit of the triode 14 is connected across the charging condenser 10 to discharge the same when the triode 14 conducts. More specifically, the plate-cathode circuit of the triode 18, 16 is connected in series with the winding 20 across the condenser 10 and when the tube conducts and the plate-cathode circuit has low impedance the condenser 10 will discharge through the coil 20. The condenser 21, bridged across the secondary winding 20, tunes the winding 20, and may be chosen to have the value required for discharging the condenser 10 in the desired time.

Triggering of the blocking oscillator is accomplished in the input circuit of the triode 14. The frequency is controlled by the circuit coupling the cathode 16 and the grid 17 which includes the transformer 15 and the network including condensers 22, 23 and 24 and resistors 25, 26 and 27. Actually, the frequency depends on the time of condensers 22, 23 and 24 in parallel with variable resistor 25. By varying the resistor 25, therefore, the repetition rate of the blocking oscillator can be controlled. A limiting resistor may be provided in the plate or grid lead to stabilize the triode 14 and reduce changes in the characteristics thereof during the warm-up time and when the tube ages.

Figure 2:
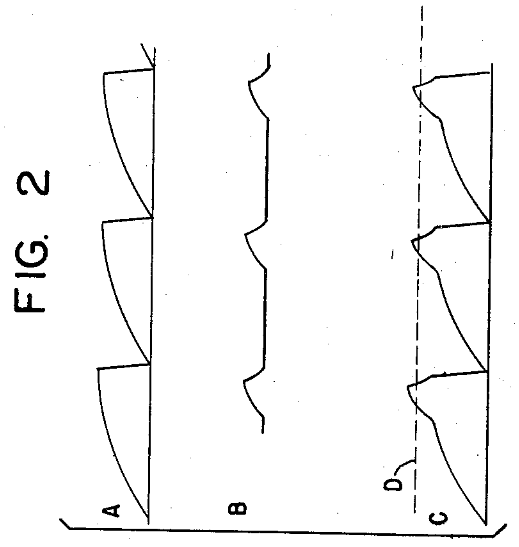
Fig. 2 illustrates the voltage waves involved in synchronizing the blocking oscillator.

The network including condensers 22, 23 and 24 and resistors 25, 26 and 27 also forms a filter for selecting synchronization signals to be applied to the grid 17 of the blocking oscillator. In Fig. 1, synchronization pulses are supplied by a synchronization signal source 28. These synchronization signals are combined in the winding 19 with the sawtooth wave induced in the winding 19 by the winding 20. This is illustrated in Fig. 2 in which curve A illustrates the sawtooth wave developed across the coil 20. As the coil 20 and the output circuit of the tube 14 are in series across the condenser 10, a portion of the voltage developed across condenser 10 will appear across the winding 20 and this portion is illustrated in curve A. Curve B illustrates the synchronization pulses which are applied to the winding 19 after being differentiated in the network previously described. Curve C illustrates the combined voltage wave produced by the superpositioning of the synchronization pulses on the portion of the output voltage wave. It is obvious that this wave has sharp peaks which are suitable for triggering the blocking oscillator. The dotted line D indicates the voltage required for triggering the blocking oscillator.

Figure 3:
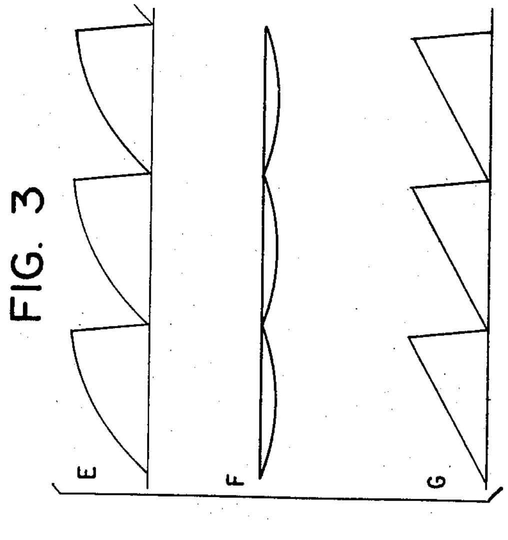
Fig. 3 illustrates the linearity correction of the produced sawtooth wave.

As previously stated the condenser 10 is charged from the source +B to a value which exceeds that over which the charging rate is linear. Actually, the condenser 10 may be charged to a voltage of the order of one-third that of the voltage source whereas voltages of the order of one-tenth are the most that can be produced while retaining linear trace portions. It is therefore desired to linearize the sawtooth voltage and this is accomplished by a differentiating and combining circuit. Resistance means including resistors 30 and 31 in series, and condenser 32 are connected in series across the condenser 10 and form a differentiating circuit. A voltage wave of parabolic wave form will therefore be produced across the condenser 32. This is illustrated in Fig. 3 with curve E representing the voltage developed across the condenser 10 and curve F representing the voltage developed across condenser 32. It is then possible to combine the voltages across the condensers 10 and 32 in the proper proportion and completely eliminate the distortion in the curve E. This is accomplished by the resistance means and the combination is controlled by the relative proportioning of the resistors 30 and 31. The values of the resistors 30 and 31 are selected so that the voltage at the common point 33 therebetween has a linear trace as indicated by curve G of Fig. 3. This wave is an accurate sawtooth wave and may be used for exciting a sawtooth current amplifier as in a magnetic deflection system or for any other purpose desired. It is obvious that instead of the resistors 30 and 31, a single resistance element may be used having an intermediate tap which may be either fixed at an optimum value or adjustable to permit changes in the linearity correction.

The sawtooth voltage generator as described may be used in various diversified applications. For example, it may be used in the deflection system of a television receiver. In such an application, the synchronization signal source 28 would be the synchronization signal clipper of a television receiver and the sawtooth voltage wave produced might be applied through coupling condenser 34 to a sawtooth current amplifier 35 for providing the current required in magnetic deflection coils. As the amplitude of the sawtooth output is fixed in any given circuit, the required amplitude control may be provided in the amplifier. The circuit has been found highly satisfactory when used in the vertical deflection system of a television receiver in which a sawtooth wave at a frequency of 60 cycles per second is required. For such an application a generator having the following constants was found to be highly satisfactory:

| | |
|---|---|
| +B potential | 200 volts |
| Condenser 10 | 0.1 microfarad |
| Resistor 12 | 220,000 ohms |
| Condenser 13 | 5 microfarads |
| Tube 14 | 6SN7 (½) |
| Transformer 15: | |
| Winding 19 | 2,000 turns |
| Winding 20 | 600 turns |
| Condenser 21 | .005 microfarad |
| Condenser 22 | .015 microfarad |
| Condenser 23 | .005 microfarad |
| Condenser 24 | .005 microfarad |
| Resistor 25 | 470,000 ohms (variable) |
| Resistor 26 | 4,700 ohms |
| Resistor 27 | 22,000 ohms |
| Resistor 30 | 68,000 ohms |
| Resistor 31 | 47,000 ohms |
| Condenser 32 | 0.1 microfarad |
| Condenser 34 | 0.1 microfarad |

When using these values the voltage wave across condenser 10, as illustrated in curve E of Fig. 3, reached a maximum value of the order of 70 volts. The corrected sawtooth wave at the point 33, as illustrated in curve G of Fig. 3, reached a maximum voltage of the order of 50 volts. It is therefore seen that the output voltage wave produced was of the order of ¼ of the voltage of the charging source as compared to a voltage of the order of $\frac{1}{10}$ that of the source in typical sawtooth voltage generators.

The values of the condenser 21 and the winding 20 of transformer 15 specified above are so related that when the generator was used in the vertical deflection system of a television receiver a relatively slow retrace was provided. The retrace or discharge time required when using these values is slow compared to the repetition rate of the horizontal synchronization pulses. This reduces the effect of the horizontal synchronization pulses on the operation of the generator and results in improved vertical synchronization and better interlace between successive fields.

The sawtooth voltage generator in accordance with the invention has been found to be very stable in operation and to provide a sawtooth wave of very accurate linearity. When used in a vertical deflection system as mentioned, the scanning lines interlaced perfectly because of the very accurate linearity. The system as disclosed is less expensive than other known systems for providing accurate sawtooth waves having amplitudes which extend to the same portion of the charging voltage. The various components are of well known construction and are not critical as to value to thereby unduly increase the cost.

Although one embodiment of the invention which is illustrated thereof has been described, it is apparent that various changes and modifications can be made therein without departing from the intended scope of the invention as defined in the appended claims.

I claim:

1. A generator for producing a sawtooth voltage wave comprising a condenser, means connecting said condenser to a source of potential for charging said condenser to such a high voltage that the charging rate decreases with time, a blocking oscillator including an electron discharge valve having plate, cathode and grid electrodes and a transformer having first and second windings, means including said transformer and a time constant network connected to said grid electrode of said valve for controlling the frequency of said blocking oscillator, said first and second windings of said transformer being connected respectively to said grid and said cathode electrodes of said valve, said plate electrode of said valve being coupled to said condenser for discharging said condenser when said valve conducts, and an integrating circuit connected across said condenser including resistance means and a second condenser across which a wave of parabolic shape is developed, said resistance means including an intermediate tap so positioned that said sawtooth wave and said parabolic wave are combined thereby to provide a sawtooth wave having substantially linear trace portions.

2. A generator for producing a high amplitude sawtooth voltage wave having a linear trace and having a frequency of the order of 60 cycles per second comprising, main condenser means, a voltage source, means for charging said condenser from said voltage source to provide the trace portion of said sawtooth wave, said means charging said condenser to a voltage of the order of one-third that of said source with the rate of increase of the voltage thereacross decreasing with time, means for discharging said condenser to provide the retrace portion of said sawtooth wave, said discharging means including a tuned discharge path for controlling the time required for said condenser means to discharge, means for integrating said sawtooth wave including resistor means and a second condenser connected in series across said main condenser means to provide a parabolic wave across said second condenser, and means including a tap on said resistance means for variably combining said parabolic wave and said sawtooth wave in such proportions that a linear sawtooth wave is derived at said tap having an amplitude of the order of one-fourth that of said voltage source.

3. A generator for producing a sawtooth voltage wave including in combination, condenser means, means connecting said condenser means to a source of potential for charging the same, a blocking oscillator including an electron discharge valve having a plate, a cathode and a grid, and a transformer having first and second windings individually connected to said grid and said cathode of said valve respectively, a network connected to said first winding for controlling the frequency of said blocking oscillator, said network being effective to selectively apply synchronization pulses to said blocking oscillator, means connecting said plate of said valve to said condenser means and providing a path through said second winding of said transformer for discharging said condenser means when said valve conducts, and a condenser for tuning said second winding for controlling the time required for said condenser means to discharge through said valve and said second winding.

4. A generator for producing a sawtooth voltage wave for use in the vertical deflection system of a television receiver, which system is synchronized by vertical synchronization pulses occurring at a frequency of the order of 60 cycles per second with which horizontal synchronization pulses occurring at a frequency of the order of 15,750 cycles per second may also be present, said generator including condenser means, a circuit for charging said condenser means, a blocking oscillator including an electron discharge valve having plate, cathode and grid electrodes and a transformer having first and second windings individually connected to said grid and said cathode electrodes of said valve respectively, means including said first winding for applying said synchronization pulses to said blocking oscillator, said plate electrode of said valve being connected to said condenser means for discharging the same through said valve and said second winding when said valve conducts, and tuning means connected across said second winding of said transformer for controlling the time required for said condenser means to discharge through said valve, said tuning means and said second winding having such values that the time required for said condenser means to discharge is substantially greater than the interval between successive horizontal synchronization pulses.

5. A generator for producing a sawtooth voltage wave for use in the vertical deflection system of a television receiver, which system is synchronized by vertical synchronization pulses occurring at a frequency of the order of 60 cycles per second with which horizontal synchronization pulses occurring at a frequency of the order of 15,750 cycles per second may also be present, said genera including condenser means, a circuit for charging said condenser means, a blocking oscillator including an electron discharge valve having plate, cathode and grid electrodes and a transformer having first and second windings individually connected to said grid and said cathode electrodes of said valve respectively, a network connected to said first winding for applying said synchronization pulses to said blocking oscillator, said plate electrode of said valve being connected to said condenser means for discharging the same through said valve and said second winding when said valve conducts, and a condenser connected across said second winding of said transformer for tuning the same and thereby controlling the time required for said condenser means to discharge, said condenser and said second winding having such values that the time required for said condenser means to discharge when said valve conducts is substantially greater than the interval between successive horizontal synchronization pulses.

6. A generator for producing a sawtooth voltage wave for use in the vertical deflection system of a television receiver, which system is synchronized by vertical synchronization pulses occurring at a frequency of the order of 60 cycles per second and in the presence of horizontal synchronization pulses occurring at a frequency of the order of 15,750 cycles per second, said generator including in combination condenser means, means for charging said condenser means, blocking oscillator means for discharging said condenser means including an electron discharge valve having plate, cathode and grid electrodes and a transformer having first and second windings individually coupled to said grid and cathode electrodes of said valve respectively, a network connected to said first winding for applying said synchronization pulses to said blocking oscillator means, said plate electrode of said valve being connected to said condenser means providing a discharge path therefor through said valve and said second winding, said charging means operating to charge said condenser means to such a value before said blocking oscillator means discharges the same that the increase in voltage across said condenser means decreases with time, a tuning condenser connected across said second winding of said transformer for tuning the same, said tuning condenser and said second winding having such values that the time required for said condenser means to discharge through said valve when said valve conducts is substantially greater than the interval between successive horizontal synchronization pulses whereby said generator is insensitive to said horizontal synchronization pulses, and means coupled to said condenser means for producing a substantially linear voltage from the voltage developed across said condenser means.

7. A generator for producing a sawtooth voltage wave including in combination, a wave forming circuit including condenser means, means for applying a current through said wave forming circuit for charging said condenser means, a blocking oscillator for discharging said condenser means including an electron discharge valve having a cathode, a control grid, and an anode, a transformer having first and second windings, filter means for selecting synchronization pulses for controlling said blocking oscillator, said first winding being connected between said filter means and said grid of said valve, means connecting said second winding between said cathode of said valve and a reference potential, said wave forming circuit being connected between said anode of said valve and said reference potential so that said condenser means is discharged through said valve and said second winding in a series circuit relation when said valve conducts, and tuning means coupled to said second winding for tuning the same to control the discharge path for said condenser means.

8. A generator for producing a sawtooth voltage wave including in combination, a wave forming circuit including first condenser means, means for applying a current through said wave forming circuit for charging said first condenser means, a blocking oscillator for discharging said first condenser means including a triode electron discharge valve having a cathode, a control grid, and an anode, a transformer having first and second coupled windings, resistor means connected in series with said first winding between said grid of said valve and a reference potential, second condenser means coupled to said resistor means and cooperating therewith to control the frequency of said blocking oscillator, means connecting said second winding between said cathode of said valve and said reference potential, and third condenser means connected across said second winding and forming a tuned circuit therewith, said wave forming circuit being connected between said anode of said valve and said reference potential so that said second condenser means is discharged through said valve and said tuned circuit in a series circuit relation when said valve conducts, said tuned circuit thereby controlling the discharge time of said condenser means.

9. A generator for producing a sawtooth voltage wave including in combination, a wave forming circuit including first condenser means, means for applying a current through said wave forming circuit for charging said first condenser means, a blocking oscillator for discharging said first condenser means including an electron discharge valve having a cathode, a control grid, and an anode, a transformer having first and second coupled windings, resistor means connected in series with said first winding, with said resistor means being connected to a reference potential and said first winding being connected to said grid of said valve, second condenser means coupled to said resistor means and cooperating therewith to form the frequency controlling means of said blocking oscillator, and tuned circuit means including said second winding connected between said cathode of said valve and said reference potential, said tuned circuit means being independent of said frequency controlling means, and said wave forming circuit being connected between said anode of said valve and said reference potential so that said first condenser means is discharged through said valve and said tuned circuit means in a series circuit relation when said valve conducts, said tuned circuit means thereby controlling the discharge time of said first condenser means.

KURT SCHLESINGER.

REFERENCES CITED

The following references are of record in the file of this patent:

UNITED STATES PATENTS

| Number | Name | Date |
|---|---|---|
| 2,147,559 | Schlesinger | Feb. 14, 1939 |
| 2,232,076 | Newsam | Feb. 18, 1941 |
| 2,254,087 | Percival | Aug. 26, 1941 |
| 2,341,396 | Smith, Jr. | Feb. 8, 1944 |
| 2,452,213 | Sontheimer | Oct. 26, 1948 |
| 2,538,261 | Moore | Jan. 16, 1951 |
| 2,539,007 | Blok et al. | Jan. 23, 1951 |

FOREIGN PATENTS

| Number | Country | Date |
|---|---|---|
| 464,141 | Great Britain | Apr. 13, 1937 |